United States Patent [19]
Meyer et al.

[11] Patent Number: 5,854,346
[45] Date of Patent: Dec. 29, 1998

[54] IMPACT MODIFIER COMBINATION FOR AROMATIC POLYESTERS

[76] Inventors: Jean-Philippe Gaetan Meyer, 20, Chemin de Camperousse, F06130 Grasse le Plan, France; Didier Michel Leblanc, 4 Fox Ct., Hainesport, N.J. 08060; Yannick Jean Yvon Chiquet, 69 BD Wilson, 06160 Juan les Pins, France

[21] Appl. No.: 757,688

[22] Filed: Dec. 3, 1996

Related U.S. Application Data

[62] Division of Ser. No. 622,793, Mar. 27, 1996, Pat. No. 5,652,306.

[51] Int. Cl.$^6$ ..................................................... C08L 67/02
[52] U.S. Cl. ............................................ 525/64; 525/166
[58] Field of Search ................................................ 525/64

[56] References Cited

U.S. PATENT DOCUMENTS

| | | | |
|---|---|---|---|
| 3,808,180 | 4/1974 | Owens | 260/885 |
| 3,985,704 | 10/1976 | Jones et al. | 260/880 |
| 4,096,202 | 6/1978 | Farnham et al. | 260/873 |
| 4,753,980 | 6/1988 | Deyrup | 524/369 |
| 5,248,725 | 9/1993 | Koyama et al. | 525/64 |

FOREIGN PATENT DOCUMENTS

| | | |
|---|---|---|
| 491 985 A1 | 12/1990 | European Pat. Off. . |
| 531008 | 8/1992 | European Pat. Off. . |
| 7923656 | 7/1977 | Japan . |

*Primary Examiner*—Patricia A. Short
*Attorney, Agent, or Firm*—Ronald S. Hermenau

[57] ABSTRACT

An improved toughened blend of an aromatic polyester with from 5 to 20 phr of an impact modifier, which impact modifier is a blend of (a) 80 to 85 weight percent of a core/shell impact modifier having a polybutadiene core and at least one shell formed from methyl methacrylate and styrene; and (b) 15 to 20 weight percent of a linear copolymer which contains from 50 to 85 parts of units derived from ethylene, from 5 to 40 parts of units derived from (meth) acrylic esters, and from 2 to 10 parts of a copolymerizable monomer containing an epoxy group. The toughened blend exhibits higher impact strength than would be calculated for the blend using a linear relationship based on values of notched Izod for two blends, each containing only one of the impact modifiers at an equal use level.

5 Claims, No Drawings

IMPACT MODIFIER COMBINATION FOR AROMATIC POLYESTERS

This is a divisional of application Ser. No. 08/622,793 U.S. Pat. No. 5,652,306, filed Mar. 27, 1996.

Aromatic polyesters, especially those based on ethylene glycol or 1,4-butylene glycol and terephthalic acid, are useful polymers when fabricated in their crystalline form as engineering plastics. Like many engineering plastics, they have relatively low impact strength and it is desirable to toughen them with impact-modifying additives. Many such additives are known, such as core/shell impact modifiers prepared in emulsion with a first stage or core of a polymer based on butadiene or on a poly(alkyl acrylate), and with one or more shells or second stages based on polymers which are mainly derived from methyl methacrylate, but which may also have polymer chains derived from vinyl aromatic monomers, such as styrene. These modifiers contribute little to the melt viscosity of the polyester, unless they contain reactive functional groups, such as epoxy groups, in the shell. For poly(butylene terephthalate), which is generally injection molded and where increased melt viscosity is undesirable, such non-functionalized core/shell polymers are commercially useful, although rather high concentrations of the impact modifiers are required, which is costly and adversely affects the modulus values of the final processed thermoplastic.

Another class of impact modifiers are rubbery linear polymers formed from ethylene, an alkyl acrylate such as ethyl or butyl acrylate, and a third monomer which has a copolymerizable double bond and an available reactive functionality, such as epoxide. A suitable monomer is glycidyl methacrylate (2,3-oxy-1-propyl methacrylate). These rubbery polymers probably are reactive with terminal hydroxyl or carboxyl groups in the polyester. They are quite efficient impact modifiers, but are known to raise the melt viscosity of the blend substantially, which is deleterious to molding and processing.

Blends of the two types of modifiers with polyesters are disclosed in European Unexamined Patent Application 531, 008, but polycarbonate in at least one part is required, and the polyester, the polycarbonate, and the core/shell impact modifier are all recovered from scrap or reclaimed polymer. It is clear that the epoxide-containing additive is functioning to tie together degraded polyester chains to restore the molecular weight.

Thus, the problem still exists to find a way to improve the impact strength of polyesters without excessive loading of a core/shell modifier, or without increasing the melt viscosity of the blend to an extent where processing is slowed.

We have found that blends of these two types of impact modifiers within a certain compositional range offer several unexpected advantages. First, the impact strength imparted by the blend of impact modifiers is unexpectedly higher than would be predicted by averaging values from blends where only one impact modifier is present. Secondly, the blend imparts acceptable impact strength values while producing a blend of acceptable melt viscosity for injection molding purposes. Third, the blend does not require the addition of expensive polycarbonate resin.

Specifically, we have discovered a toughened blend of an aromatic polyester, preferably an alkylene terephthalate, and most preferably poly(butylene terephthalate), with from 5 to 20 parts (per 100 parts of polyester) of an impact modifier, which impact modifier is a blend of (a) 80 to 85 weight percent of a core/shell impact modifier having
  (1) from 70 to 90 parts of a core of a rubber which is a homopolymer of butadiene or a copolymer of butadiene with up to about 30% of at least one copolymerized vinyl monomer;
  (2) at least one shell, which shell is a homopolymer of methyl methacrylate or a copolymer which contains a majority of units derived from either methyl methacrylate or styrene; and (b) 15 to 20 weight percent of a linear copolymer which contains from 50 to 85 parts of units derived from ethylene, from 5 to 40 parts of units derived from a $C_1$–$C_8$ ester of (meth)acrylic acid, and from 2 to 10 parts of a copolymerizable monomer containing an epoxy group. Within this range of compositions, the toughened blend exhibits higher impact strength, as measured by a notched Izod test, than would be calculated for the blend using a linear relationship based on values of notched Izod for two blends, each containing only one of the impact modifiers at an equal use level.

Preferred is the composition wherein the rubber and/or at least one shell further contains units derived from a multi-unsaturated monomer. An especially preferred combination contains 75 to 80 parts of a rubber which is compositionally >93% of units derived from butadiene, 5% of units derived from styrene, and 0.5 to 1% of units derived from divinylbenzene. In this composition there are equal parts of a shell which is essentially polystyrene, and of a final shell which is essentially poly(methyl methacrylate. U.S. Pat. No. 3,985, 704 should be consulted as to a means for preparing and isolating such a modifier.

Also preferred is the composition wherein the $C_1$–$C_8$ ester of (meth)acrylic acid of the linear copolymer is ethyl acrylate, and/or wherein the copolymerizable monomer containing an epoxy group of the linear copolymer is glycidyl methacrylate. An especially preferred composition is about 70% ethylene, about 25 to about 30% of ethyl acrylate, and 2 to 8% of glycidyl methacrylate. A preferred melt index for the linear copolymer is from about 6 to about 8 grams/10 minutes, measured at 190° C. at 16 kg. load.

It is desirable to stabilize the diene-containing impact modifier against degradation during isolation and/or processing; for this purpose, it is preferred to add to the core/shell polymer before isolation low levels of a phosphite, such as tris(nonylphenyl) phosphite, and one or more hindered phenols.

We further have discovered a toughened blend of an aromatic polyester, preferably an alkylene terephthalate, and most preferably poly(butylene terephthalate), with from 5 to 20 parts (per 100 parts of polyester) of an impact modifier, which impact modifier is a blend of (a) 80 to 85 weight percent of a core/shell impact modifier having
  (1) from 70 to 90 parts of a core of a rubber which is a homopolymer of butyl acrylate or 2-ethylhexyl acrylate or a copolymer of butyl acrylate and/or 2-ethylhexyl acrylate with up to about 30% of at least one other copolymerized vinyl monomer;
  (2) at least one shell, which shell is a homopolymer of methyl methacrylate or a copolymer which contains a majority of units derived from either methyl methacrylate or styrene; and (b) 15 to 20 weight percent of a linear copolymer which contains from 50 to 85 parts of units derived from ethylene, from 5 to 40 parts of units derived from a $C_1$–$C_8$ ester of (meth)acrylic acid, and from 2 to 10 parts of a copolymerizable monomer containing an epoxy group. Within this range of compositions, the toughened blend exhibits higher impact strength, as measured by a notched Izod test, than would be calculated for the blend using a linear relationship based on values of notched Izod for two blends, each containing only one of the impact modifiers at an equal use level. In general, the impact modifiers with an acrylate copolymer core are less efficient impact modifiers than those based on polybutadiene, and this disparity holds even when the linear terpolymer is combined. However, there are advantages in weatherability and thermal stability for the blends based on core/shell copolymers with acrylate-based rubbery cores.

The impact modifiers may be in powder, flake, or pellet form. They may be blended together before admixture with the polyester, or admixed with the polyester during melting and mixing in preparation either for direct molding or pelletization for later molding.

The blends may be pelletized and molded or extruded on conventional equipment recommended for processing poly(butylene terephthalate). For the purposes of determining impact strength, samples are first compounded on a twin-screw extruder (200 rpm, 10 kg./hr. through put, temperature profile from hopper to die 240°, 245°, 245°, 250°, and 255° C.) from a powder blend, air-dried for 4 hours at 120° C., and injection molded (temperature profile from hopper to die 265°, 260°, 255°, and 250° C.) at a mold temperature of 85° C. and a 250 second cooling time in a standard multi-cavity mold into notched Izod bars of 3.2 mm. thickness, and tested by ASTM D-256. The melt viscosity of the blends is measured qualitatively, by finding conditions where the unmodified polyester or the polyester containing only the core/shell impact modifier exhibit adequate flow, and then comparing the pressure reading for those samples versus pressure readings for the binary combinations and ternary compositions containing the linear additive polymer having epoxide groups. A higher pressure indicates more difficulty in extrusion, higher melt viscosity, and longer times for mold filling.

Impact-modified poly(butylene terephthalate), as represented in this invention, is useful for transportation-related molded items, such as for automobiles, buses, motorcycles, trucks, airplanes, boats, and trains. Such parts are useful in bumpers, fenders, and crash helmets. The blends, often in combination with flame-retardants and/or glass fibers, are useful in the electrical sector, for plugs, connectors, boxes, and switches, and other uses where high strength and toughness are desirable. Such blends are also useful for appliances, such as computers, refrigerator housings, and television housings or casings.

EXAMPLE 1

This Example illustrates the unexpected results for a blend of two impact modifiers in poly(butylene terephthalate). The core/shell impact modifier is a core/shell polymer, prepared essentially as in U.S. Pat. No. 3,985,704, of 77.5 parts of a butadiene/styrene 95/5 core, 11.25 parts of a styrene first stage, and 11.25 parts of a methyl methacrylate second stage. The polymer is stabilized with a mixture of hindered phenols and tris(nonylphenyl)phosphite prior to spray-drying, and has been pelletized prior to blending. The linear terpolymer is believed to be a terpolymer containing about 70% of ethylene, 25 to 30% of ethyl acrylate and 2 to 8% glycidyl methacrylate. Blends are made with poly(butylene terephthalate) of each modifier separately at 18%, and of a combination of modifiers (15 parts core/shell and 3 parts linear terpolymer).

TABLE I

|  | Blend (B1) | Core/shell Impact Modifier (IM1) | Linear Terpolymer Impact Modifier (IM2) | Calculated for B1 Blend |
|---|---|---|---|---|
| Amount | 15 IM1 and 3 IM2 | 18 | 18 | (adjusted average) |
| Izod, −20° C. | 647 | 101 | 260 | 128 |
| Izod, −10° C. | 795 | 396 | 954 | 489 |
| Izod, +23° C. | 851 | 744 | 1162 | 814 |

EXAMPLE 2

This Example illustrates the unexpected results for a blend of two impact modifiers in poly(butylene terephthalate). The core/shell impact modifier is a core/shell polymer, prepared essentially as in U.S. Pat. No. 3,808,180, of 80 parts of a butyl acrylate/trimethylolpropane triacrylate/diallyl maleate terpolymer core, and 20 parts of a methyl methacrylate second stage, of particle size ca. 350 nm., isolated from emulsion by spray-drying. The linear terpolymer is believed to be a terpolymer containing about 70% of ethylene, 25 to 30% of ethyl acrylate and 2 to 8% glycidyl methacrylate. Blends are made with poly(butylene terephthalate) of each modifier separately at 18%, and of a combination of modifiers (15 parts core/shell and 3 parts linear terpolymer).

TABLE II

|  | Blend (B2) | Core/shell Impact Modifier (IM3) - Acrylic | Linear Terpolymer Impact Modifier (IM2) | Calculated for B2 Blend |
|---|---|---|---|---|
| Amount | 15 IM3 and 3 IM2 | 18 | 18 | (adjusted average) |
| Izod, −20° C. | 120 | 84 | 260 | 113 |
| Izod, 0° C. | 622 | 136 | 1058 | 289 |
| Izod, +23° C. | 791 | 559 | 1162 | 659 |

EXAMPLE 3

This Example illustrates the unexpected results for the Vicat softening temperature of a blend of two impact modifiers in poly(butylene terephthalate). The core/shell impact modifier and the linear terpolymer are those of Example I. Binary blends are made at 22% of each modifier, the Vicat softening temperature determined, and the value for 18% calculated by interpolating between these values and the value of unmodified PBT from the literature. The values for the binary blends are then averaged in a 15:3 ratio to estimate the Vicat value for the ternary blend of Example 1 as it would be expected from the values for its components.

The ternary blend of Example I is directly measured; its value of 138° C. is above the value calculated for the blend (134° C.).

TABLE III

| | Blend (B3) | Core/shell Impact Modifier (IM1) | Linear Terpolymer Impact Modifier (IM2) | Calculated for B3 Blend |
|---|---|---|---|---|
| Composition | 15 IM1 and 3 IM2 | 22; 18 (calc.) | 22; 18 (calc.) | (adjusted average) |
| Vicat Softening Temperature, °C. | 138 | 127 (136) | 113 (125) | 134 |
| 18 part value calculated from linear interpolation of 0 and 22 part values | | | | taken from 18 part values and linearly averaged |

EXAMPLE 4

This Example illustrates the rheology behavior for blends of the two impact modifiers of Example I and of Example 2 in poly(butylene terephthalate). Here the conditions are established to obtain a filled mold with good appearance from the unmodified poly(butylene terephthalate), and the melt pressure is measured in bars ( 1 bar=$10^6$ cm.$^2$). Then the various combinations are molded and the pressure developed is recorded. A higher melt pressure is indicative of more difficult molding, generally requiring a higher molding temperature to correct.

TABLE IV

| | Blend (B1) | Core/shell Impact Modifier (IM1) | Linear Terpolymer Impact Modifier (IM2) | Blend (B2) | Core/shell Impact Modifier (IM3) |
|---|---|---|---|---|---|
| Amount | 15 IM1 and 3 IM2 | 18 | 18 | 15 IM3 and 3 IM2 | 18 |
| Melt pressure, bars* | 18 | 9 | 33 | 12 | 10 |

*Extruder melt pressure reading for adequate molding

We claim:

1. A toughened blend consisting essentially of an aromatic polyester with from 5 to 20 parts, per 100 parts of polyester, of an impact modifier, which impact modifier is a blend of (a) 80 to 85 weight percent of a core/shell impact modifier having
   (1) from 70 to 90 parts of a core of a rubber which is a homopolymer of butadiene or a copolymer of butadiene with up to about 30% of at least one copolymerized vinyl monomer;
   (2) at least one shell, which shell is a homopolymer of methyl methacrylate or a copolymer which contains a majority of units derived from either methyl methacrylate or styrene; and (b) 15 to 20 weight percent of a linear copolymer which contains from 50 to 85 parts of units derived from ethylene, from 5 to 40 parts of units derived from a $C_1$–$C_8$ ester of (meth)acrylic acid, and from 2 to 10 parts of a copolymerizable monomer containing an epoxy group;

wherein the blend contains essentially no polycarbonate, and wherein the toughened blend exhibits higher impact strength, as measured by a notched Izod test, than would be calculated for the blend using a linear relationship based on values of notched Izod for two blends, each containing only one of the impact modifiers at an equal use level.

2. The composition of claim 1 wherein the polyester is poly(butylene terephthalate).

3. The composition of claim 1 wherein the rubber or at least one shell further contains units derived from a multi-unsaturated monomer.

4. The composition of claim 1 wherein the $C_1$–$C_8$ ester of (meth)acrylic acid of the linear copolymer is ethyl acrylate.

5. The composition of claim 1 wherein the copolymerizable monomer containing an epoxy group of the linear copolymer is glycidyl methacrylate.

* * * * *